United States Patent
Ohyama et al.

(10) Patent No.: US 7,672,004 B2
(45) Date of Patent: Mar. 2, 2010

(54) FORMAT CONVERTIBLE IMAGE PROCESSING SYSTEM, AND PROGRAM

(75) Inventors: Maki Ohyama, Kawasaki (JP); Hiroyuki Kawamoto, Kawasaki (JP); Isao Miyamoto, Yamato (JP); Takeharu Tone, Tokyo (JP); Satoshi Ohkawa, Nishitokyo (JP); Taira Nishita, Tokyo (JP); Hiroshi Arai, Kawaguchi (JP); Naoki Sugiyama, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 1027 days.

(21) Appl. No.: 11/082,897

(22) Filed: Mar. 18, 2005

(65) Prior Publication Data

US 2005/0259279 A1    Nov. 24, 2005

(30) Foreign Application Priority Data

Mar. 19, 2004   (JP)   ............................. 2004-080634

(51) Int. Cl.
  *G06F 3/12*   (2006.01)
  *H04N 1/46*   (2006.01)
(52) U.S. Cl. ...................... 358/1.15; 358/404; 358/407; 358/530; 358/531
(58) Field of Classification Search ................ 358/1.13, 358/1.15, 1.16, 1.9, 523, 524, 539, 474; 348/207.1, 348/207.11; 382/162, 167
See application file for complete search history.

(56) References Cited

U.S. PATENT DOCUMENTS

| | | | | |
|---|---|---|---|---|
| 5,680,528 A * | 10/1997 | Korszun | ...................... | 345/630 |
| 5,739,924 A * | 4/1998 | Sano | .......................... | 358/487 |
| 6,043,909 A * | 3/2000 | Holub | ........................ | 358/504 |
| 6,356,339 B1 * | 3/2002 | Enomoto | ...................... | 355/40 |
| 7,340,766 B2 * | 3/2008 | Nagao et al. | ................. | 725/105 |
| 2002/0105677 A1 | 8/2002 | Sato | | |
| 2003/0020940 A1 | 1/2003 | Nakamura et al. | | |
| 2003/0123104 A1 * | 7/2003 | Sasakuma et al. | ........... | 358/474 |
| 2003/0184652 A1 * | 10/2003 | Tanaka et al. | ............ | 348/207.1 |

* cited by examiner

*Primary Examiner*—James A Thompson
(74) *Attorney, Agent, or Firm*—Oblon, Spivak, McClelland, Maier & Neustadt, L.L.P.

(57) ABSTRACT

An image processing system connects a plurality of clients to an image processing apparatus via a network. The image processing apparatus includes a reading device that reads an image of an original document and generates a prescribed image signal, an image data generating device that applies prescribed image processing to the image signal to generate image data, and a memory that stores the image data. A format converting device is provided to convert an image format of the image data selected from the memory by one of plurality of client apparatuses into a prescribed format in accordance with a format condition designated by the client apparatus. A delivering device is provided to deliver the image data to the client apparatus in the prescribed format.

14 Claims, 15 Drawing Sheets

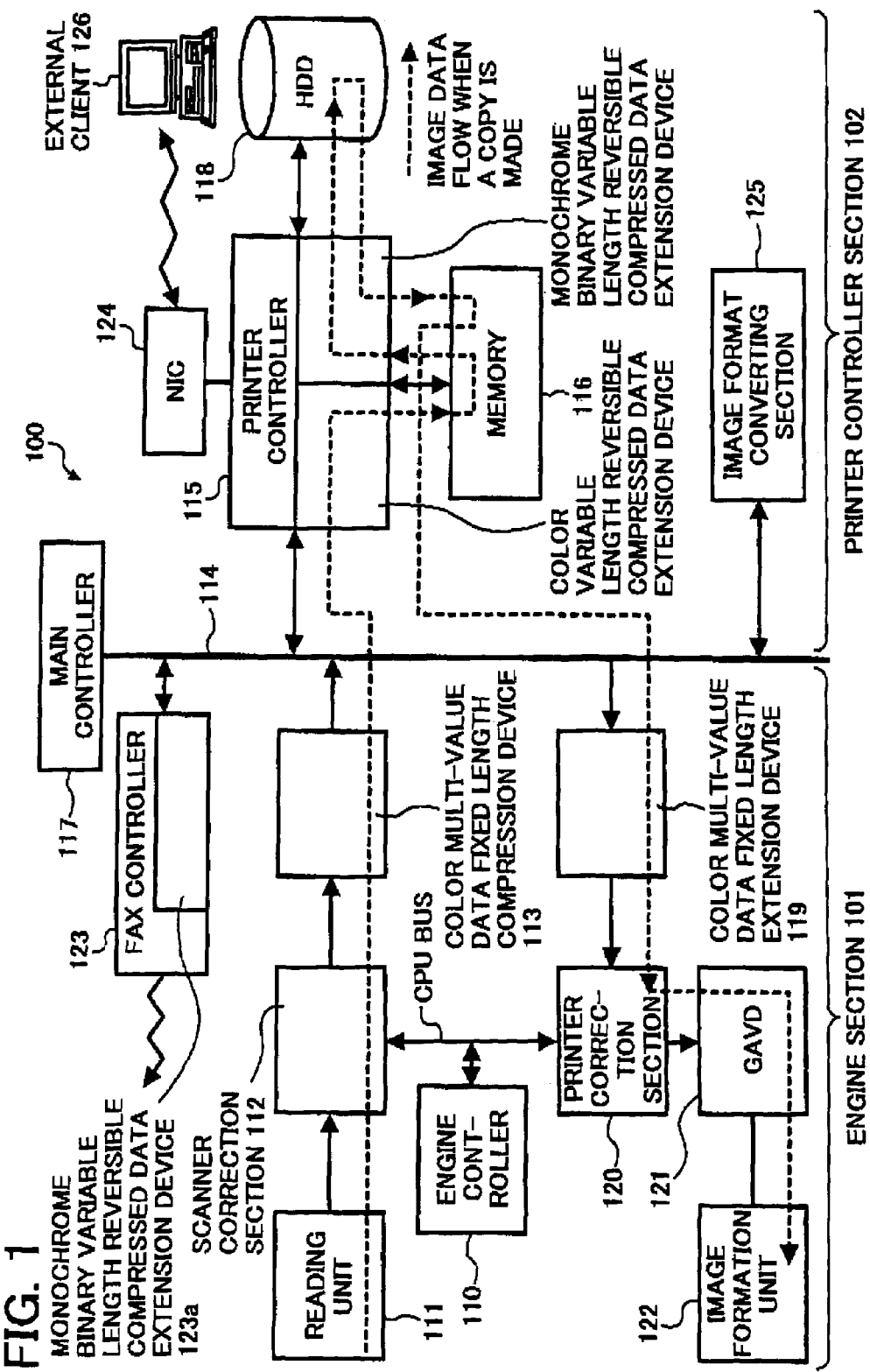

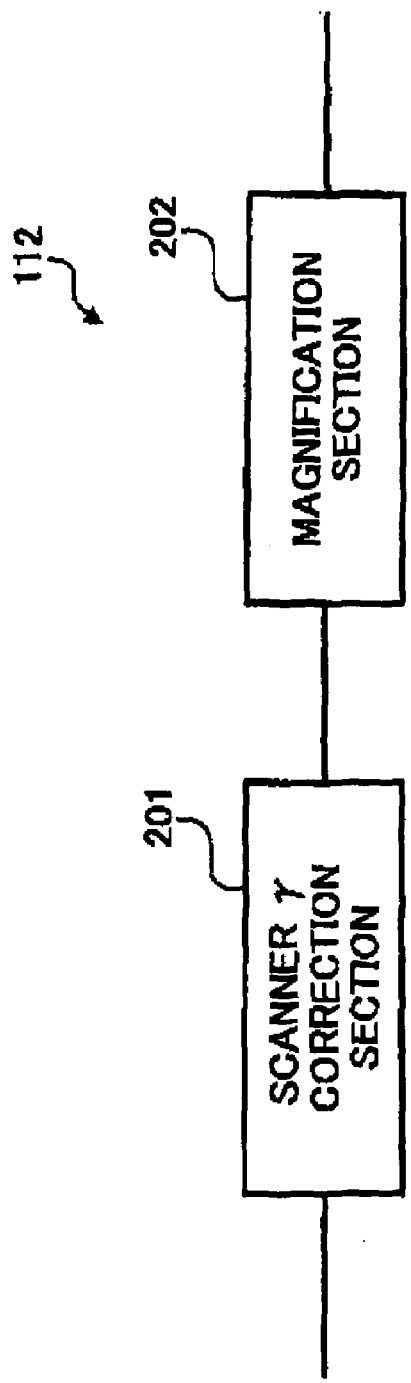
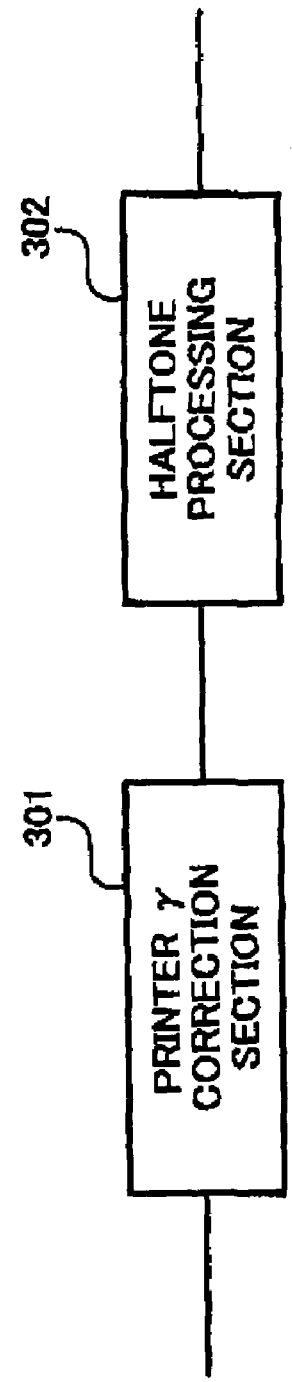

FIG. 9C
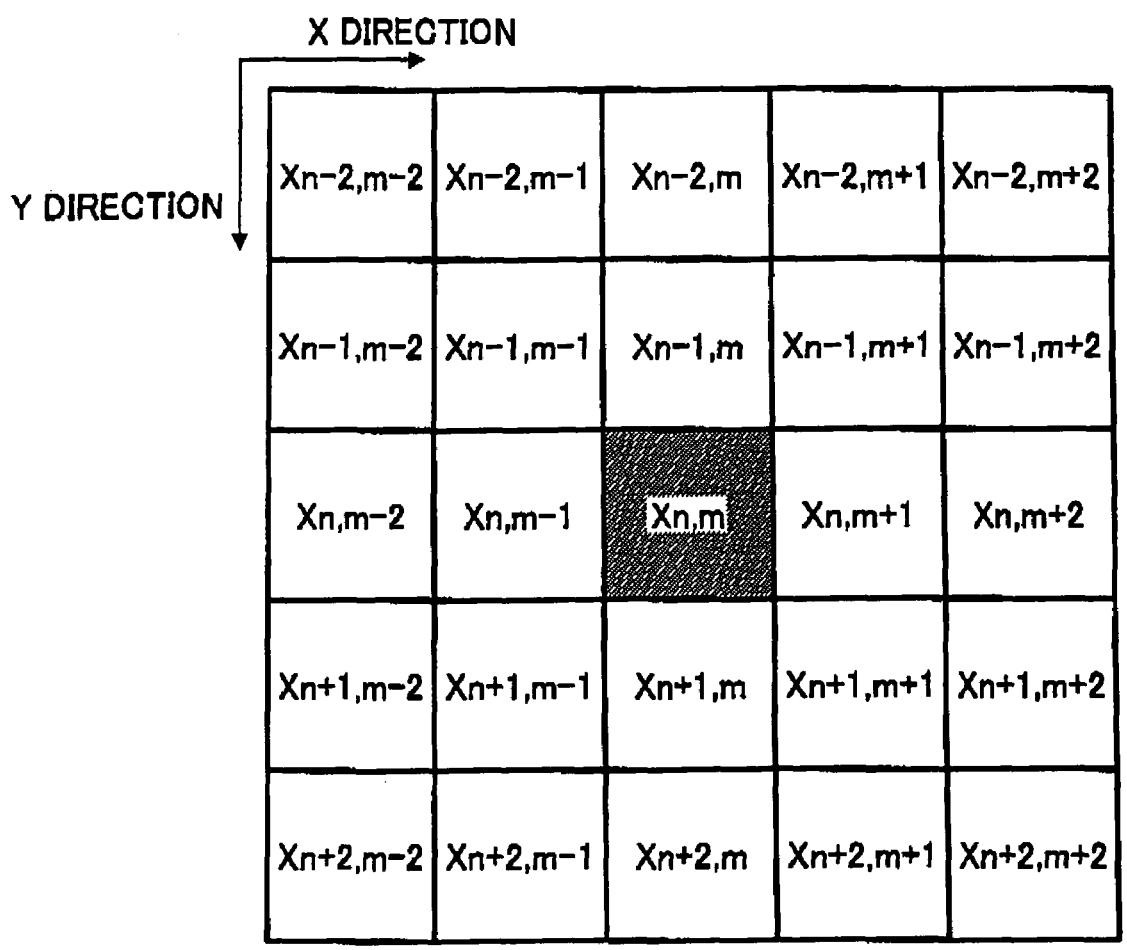
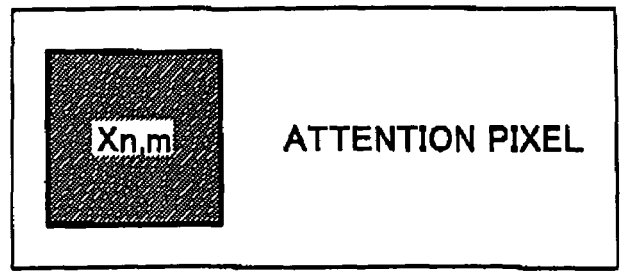
ATTENTION PIXEL

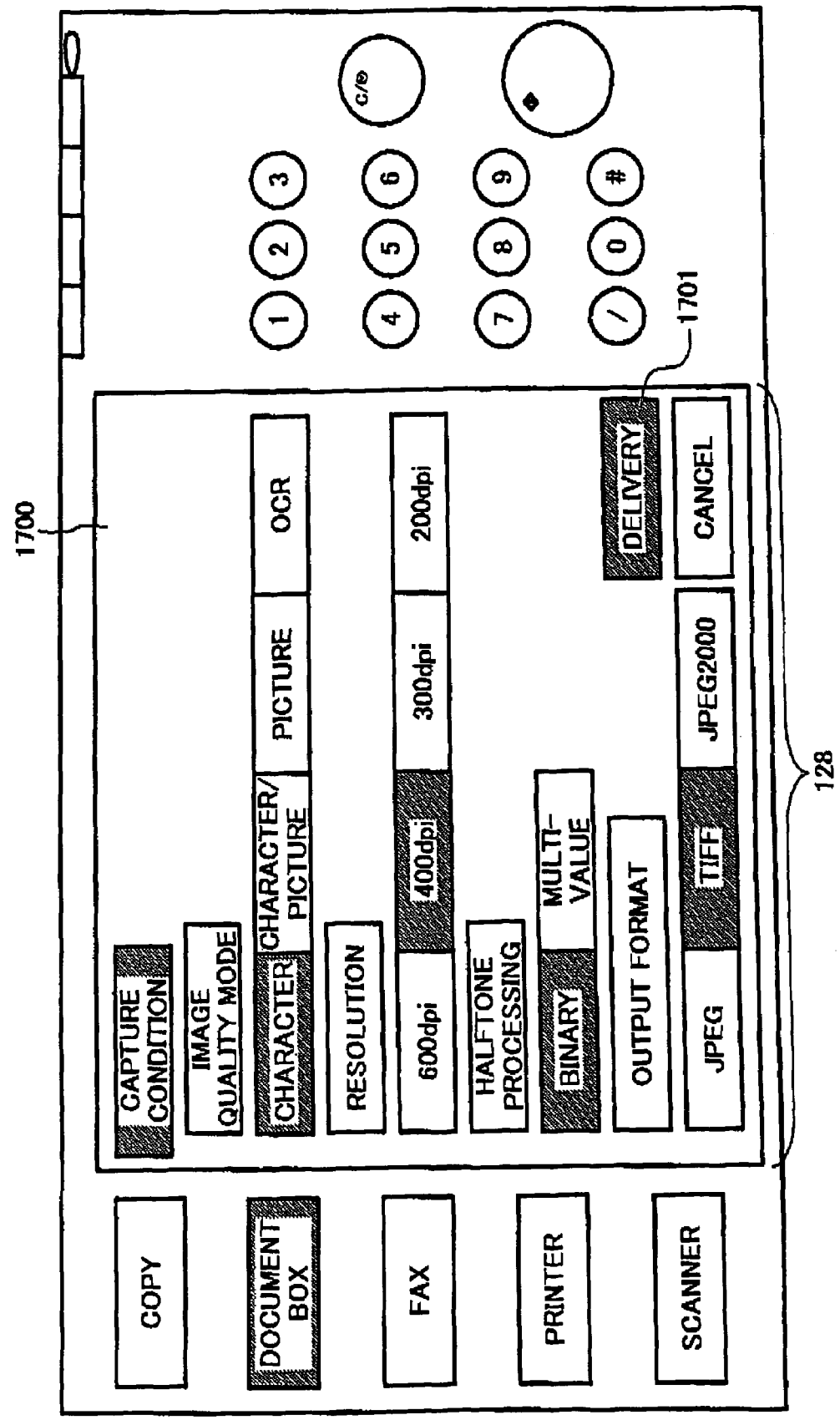

FORMAT CONVERTIBLE IMAGE PROCESSING SYSTEM, AND PROGRAM

CROSS REFERENCE TO RELATED APPLICATION

This application claims priority under 35 USC §119 to Japanese Patent Application No. 2004-080634 filed on Mar. 19, 2004, entire contents of which are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

BACKGROUND OF THE INVENTION

1. Field of the Invention

The present invention relates to an image processing system, method, and program capable of delivering image data stored in an image processing apparatus to an external apparatus.

2. Discussion of the Background Art

A network scanner technology generally enables a digital copier to scan an image on an original document using a scanner or an image reading apparatus and deliver image data to another terminal over a network, as discussed in the Japanese Patent Application Laid Open Nos. 2000-333026 and 2001-150744.

According to the Japanese Patent Application Laid Open No. 2000-333026, images read at an image inputting section of an image forming apparatus are stored in a scan box (e.g. a hard disc) included in an extension box that is formed based on an architecture of a multi-purpose use computer system. Then, the images can be shared by a plurality of computer systems over the network.

Such a scanner box is utilized as follows: First, a scan parameter, such as a resolution level, gradation, magnification, a read objective surface, an image size, a storage destination, etc., is selected and an original document is read. Image data is thus obtained and transferred to an image processing section, and is processed in accordance with the scan parameter. However, printing of the image data is not intended, no data format is generated. Color coordinate conversion from RGB to YMCK, gradation correction, and compression processing of image data are omitted by the same reason. In any event, the image data having undergone such image processing is transferred to an extension box. The extension box temporally stores the image data in a prescribed region of the hard disc. When all document pages have been stored, a client apparatus (i.e., one of computer systems) reads prescribed image data from the scan box though the network.

However, according to such a background technology, even the same type digital copier is employed at the client apparatus side, such a digital copier outputs an image in a different format from that outputted by the digital copier of the network scanner side. Further, image processing manners to be applied to image data for copy print use and that for delivery use by means of a scan box are different from each other.

Further, when copying and delivering an image, an original document is read by depressing a copy button and a scanner button, separately. Thus, scanning of the same original document is needed twice, resulting in troublesome task.

Further, according to the background technology, since image data stored in the hard disc is almost always in a private use format handled by the digital copier, and is compressed by a private use compression algorithm to save a memory, an image cannot be inspected and edited by an external client apparatus using a multi-purpose application.

Further, according to the background technology, since image data is transferred to and processed by an image processing section in accordance with the scan parameters, and is stored in a memory device, image format conversion cannot be applied to such storage data. As a result, when a plurality of users desire to receive image data in different image formats, scanning has to be repeated as needed in accordance with their situations.

SUMMARY OF THE INVENTION

Accordingly, an object of the present invention is to address and resolve such and other problems and provide a new and novel image processing system that connects a plurality of client apparatuses to an image processing apparatus via a network. The image processing apparatus includes a reading device for reading an image of an original document while generating a prescribed image signal, an image data generating device for applying prescribed image processing to the image signal and generating image data, and a memory for storing the image data. A format converting device is provided to convert an image format of image data selected from the memory by a prescribed client apparatus into a prescribed format in accordance with a format condition designated by the prescribed client apparatus. A delivering device is provided to deliver the image data in the prescribed format to the prescribed client apparatus. A control device is provided to generally control the image processing apparatus.

In another embodiment, a format condition designating device is provided in the image processing apparatus to designate a format condition.

In yet another embodiment, the format condition includes one of image qualities of character, picture and character, picture, and OCR.

In yet another embodiment, the format condition includes resolution information, image format information for identifying a format of the image data, and halftone processing information for generating either binary data or multi-value data.

In yet another embodiment, the format converting device includes a resolution converting member for converting a resolution level of the image data, a filter processing member for applying prescribed filter processing to the image data, a density gamma processing member for applying prescribed density gamma processing to the image data, a halftone processing member for applying prescribed halftone processing to the image data, and a format converting member for converting an image format of the image data into a prescribed image format.

In yet another embodiment, a computer program product is provided to store instructions for execution on a computer system, which when executed by the computer system, causes the computer system to control the image processing system.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 1 illustrates an exemplary image processing system according to a first embodiment of the present invention;

FIG. 2 illustrates an exemplary scanner correction section;

FIG. 3 illustrates an exemplary printer correction section;

FIGS. 9A, 9B, and 9C each illustrates exemplary filtering processing;

FIG. 17 illustrates an exemplary delivery condition selection screen displayed on the display section of the image processing apparatus.

PREFERRED EMBODIMENTS OF THE PRESENT INVENTION

Figure 4:
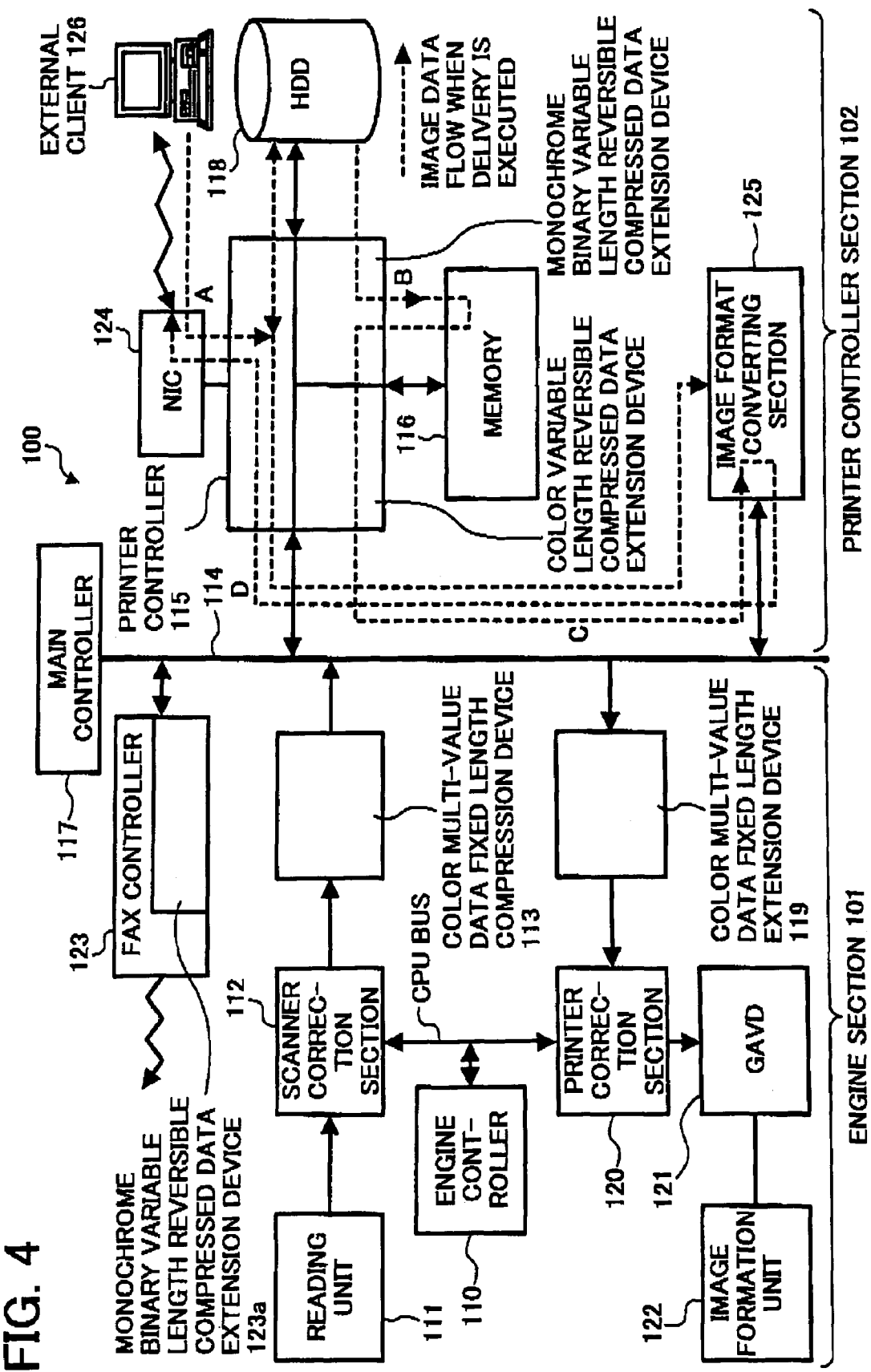
FIG. 4 illustrates an exemplary operation of the image processing system of FIG. 1.

Referring now to the drawing, wherein like reference numerals designate identical or corresponding parts throughout several views, in particular in FIG. 1, an exemplary image processing system according to a first embodiment is described. As shown, the image processing system is formed from an image processing apparatus 100 and an external client 126 connected to the image processing apparatus 100 over a network. The image processing apparatus 100 serves as a multifunctional machine including copying and printing functions or the like. A general image processing of the image processing apparatus 100 is now described, wherein arrows indicate flowing directions of image data.

The image processing apparatus 100 are roughly divided into an engine section 101 and a printer controller section 102.

The engine section 101 is entirely controlled by an engine controller 110. A reading unit 111 provided in the engine section 101 reads and transmits an image of an original document to a scanner correction section 112 as image data having R, G, and B component colors. As shown in FIG. 2, a scanner $\gamma$ correction section 201 applies scanner gamma processing, and a magnification section 202 applies magnification processing to the RGM image data in the scanner correction section 112.

Data includes 8 bits after receiving the processing from the scanner correction section 112 and is converted into n-bits data per component color by a color multi-value data fixed length compression device 113, wherein the number n is equal or grater than eight. The image data thus compressed is transmitted to a printer controller 115 via a multi-purpose bus 114.

The printer controller 115 includes a semiconductor memory 116 that stores image data transmitted under control of a main controller 117. The main controller 117 includes a microcomputer and dedicatedly controls the entire image processing apparatus 100.

Further, a hard disc 118 is enabled to occasionally store image data stored in the semiconductor memory 116 to avoid rereading of the original document and executing electronic sorting, even when a sheet to be printed out by the image processing apparatus 100 is jammed and resulting in unsuccessful completion. Further, the image data read from the original document is stored simply to output again upon need.

When image data is to be outputted, the image data in the hard disc 118 is spread out in the semiconductor memory 116, and is transmitted to the engine section 101 via the multi-purpose bus 114. A color multi-value data fixed length extending device 119 is provided in the engine section 101 and converts the image data into RGB image data with eight bits per component color. The image data after such conversion is transmitted to a printer correction section 120.

As shown in FIG. 3, a printer gamma correction section 301 applies printer gamma correction to the RGB image data in the printer correction section 120. Then, a halftone processing section 302 applies halftone processing suitable for a GAVD 121 and an image formation unit 122 and transmits and outputs data to the next step for image formation on a transfer sheet.

A facsimile controller 123 controls a facsimile function of the image processing apparatus 100 to communicate image data with a prescribed network such as a telephone line. A monochrome binary variable length reversible compression data extension device 123a executes compression and extension of the image data.

Now, series of processing executed before the external client 126 captures image data from the image processing apparatus 100 is described with reference to FIGS. 4, 5, and 6.

A network interface controller (NIC) 124 connects the image processing apparatus 100 to a LAN as an interface. An image format conversion section 125 is provided as described later in detail.

Since the hard disc 118 stores image data which has undergone scanner correction as mentioned above, a user can display and inspect tiles (e.g. document names) of the image data on a display of the external client 126.

Figure 5:
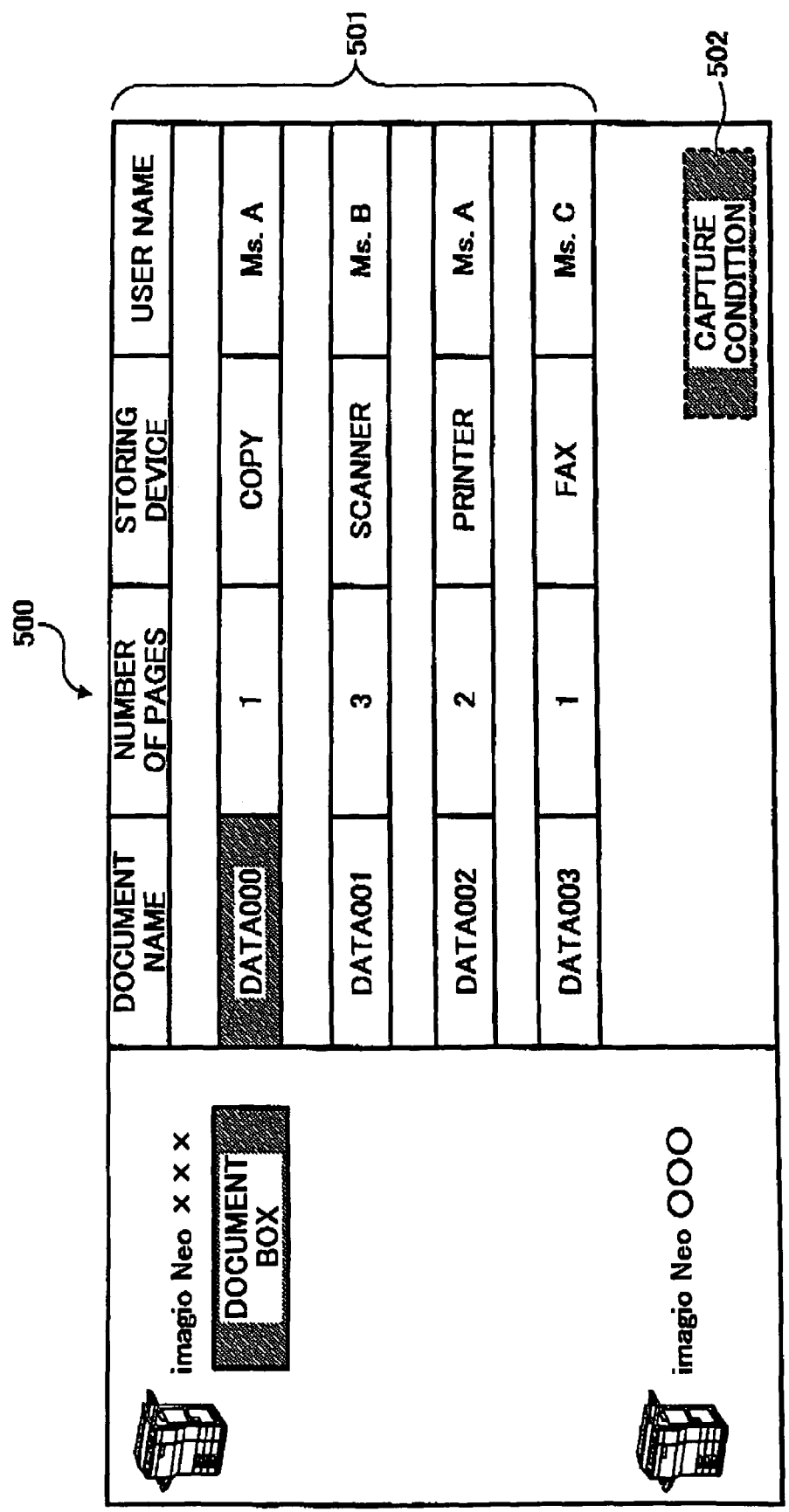
FIG. 5 illustrates an exemplary image data selection screen displayed on a display section of an external client apparatus.
Figure 6:
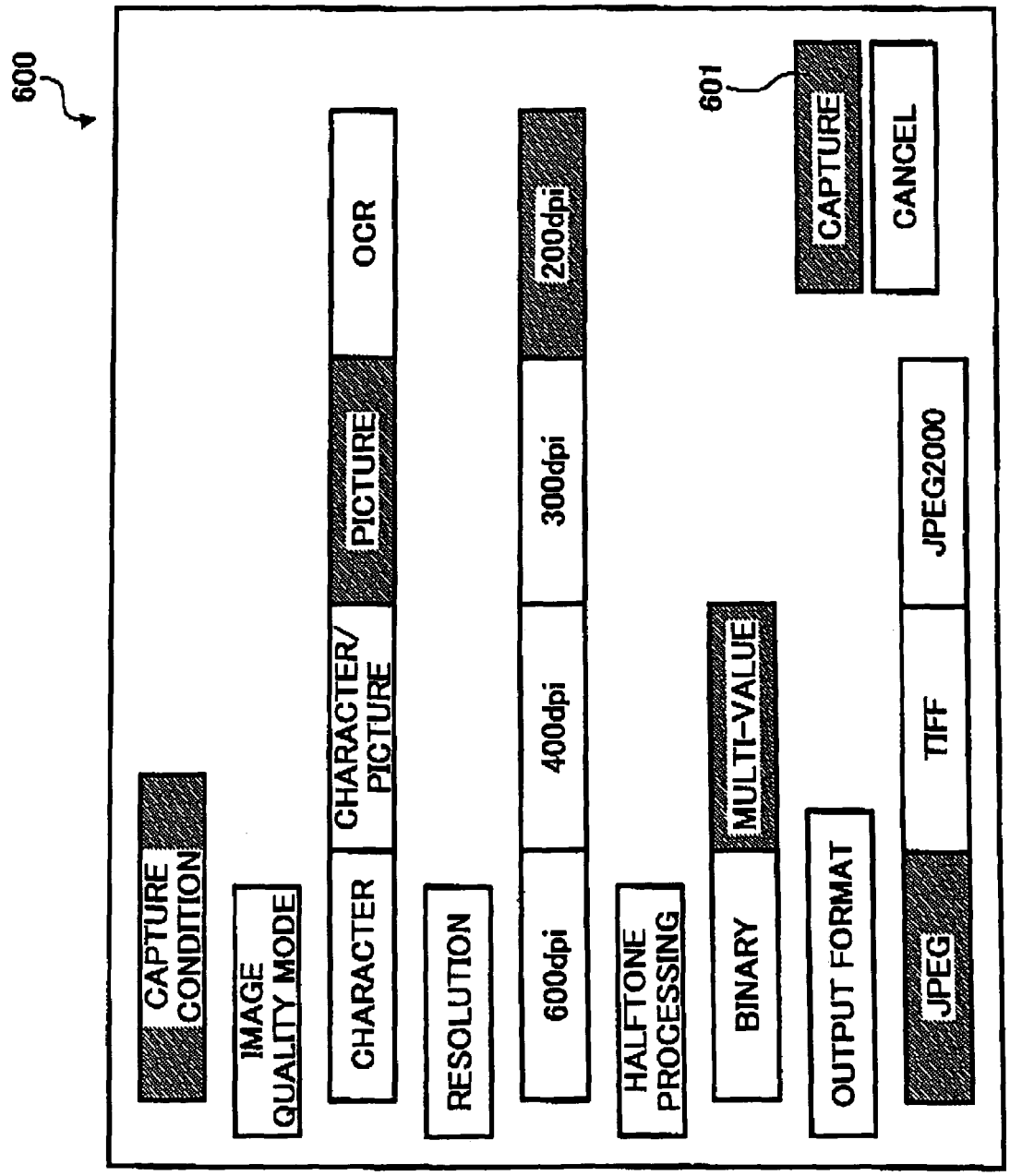
FIG. 6 illustrates an exemplary capture condition selecting screen displayed on the display section of the external client apparatus.

When the user select image data to be captured, for example, by selecting Data 000 among image data 501 and depressing a capture condition button 502 on a capture selection screen 500 of FIG. 5, a capture condition designating screen 600 appears on a display section of the external client apparatus 126 as shown in FIG. 6. Various conditions for capturing, such as image quality (e.g. a character, a character/picture, a picture, an OCR), a resolution level (e.g. 600 dpi, 400 dpi, 300 dpi, 200 dpi), halftone processing (e.g. binary, multi-value), an output format (e.g. JPEG, TIFF, JPEG 2000), etc., can be designated on the capture condition designating screen 600. When a capture button 601 is depressed, capture processing starts.

Thus, a capture condition can be designated such that image quality is a picture, a resolution is 200 dpi, halftone processing is a multi-value, an output format is JPEG, as shown in FIG. 6.

When such a capturing condition is designated in the external client apparatus 126, and a request for capturing image data stored in a hard disc 118 is practically made, the capturing condition is transmitted to the printer controller 115 as shown in FIG. 4A. Then, the printer controller 115 spreads out the image data of the hard disc 118 in the semiconductor memory 116 as shown in FIG. 4B. Then, the printer controller 115 determines a manner of image processing to be applied to designated image data to meet the capturing condition by checking the image data in the semiconductor memory 116. The printer controller 115 then transmits the image data in the semiconductor memory 116 together with an execution command indicating the image processing manner to an image format conversion section 125 via a multi-purpose bus 114 as shown in FIG. 4C. The image format conversion section 125 applies prescribed image processing to the image data upon reception. For example, gamma correction processing for picture mode use, filtering processing for picture mode use, magnification processing at 200 dpi, halftone processing for generating multi-value data, etc., are applied, because a capturing request is for a picture mode. The image format conversion section 125 then delivers the image data having undergone such image processing to the external client apparatus 126 via the NIC 124 as shown in FIG. 4D. A plurality of external client apparatuses 126 can receive delivery of image data in conformity with respective capturing conditions if designated by these external client apparatuses 126.

As mentioned in the above, image data to be stored in the hard disc 118 has a prescribed color space, which is read by a color copier as a copy image. The prescribed color space can be a color space such as Yuv, CMY, etc., dependent to a type of a device (i,e., apparatus characteristic), or that such as sRGB independent therefrom. When a prescribed color space signal is transmitted to another apparatus over the network as is, the signal is corrected to be available in another client apparatus. The prescribed color space can be typical sRGB, Lab spaces, or a private use color space commonly used between different type instruments.

Figure 7:
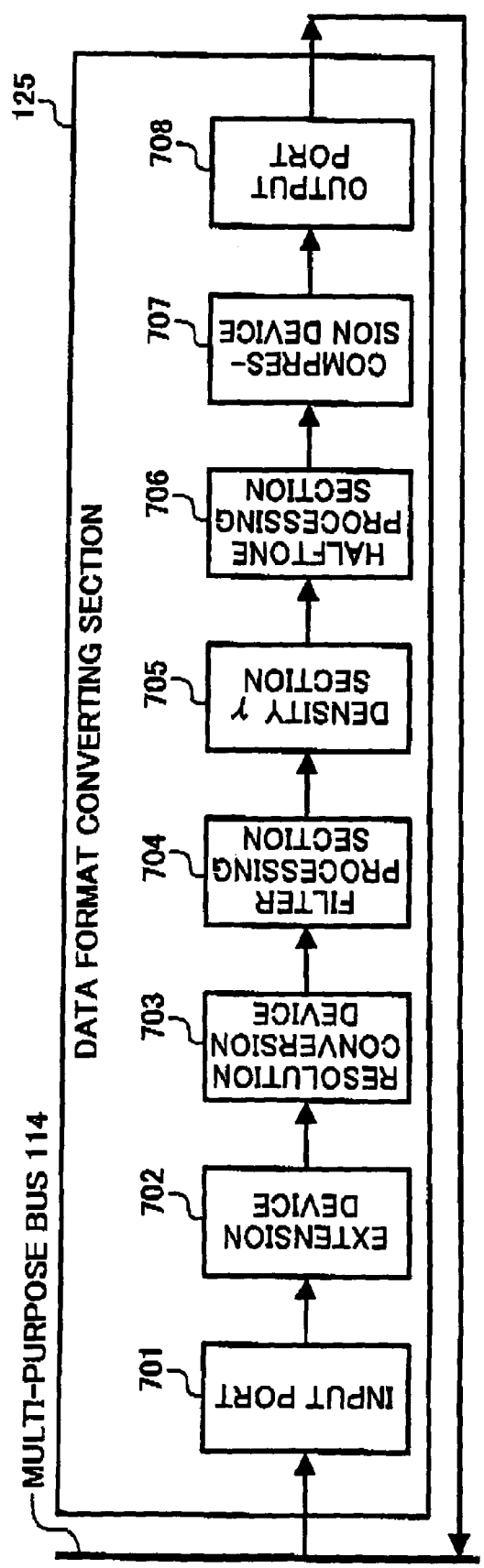
FIG. 7 illustrates an exemplary image format conversion section.

Now, an image format conversion section 125 is described in detail with reference to FIG. 7.

As shown, an input port 701 receives image data stored in the hard disc 118 together with an execution command from the printer controller 115 via the multi-purpose bus 114. The extension device 702 subsequently extends such compressed image data.

Resolution of the extended image data is then converted by a resolution conversion device 703 into a prescribed level to meet the above-mentioned capture condition. Since the image data is assigned resolution level information (e.g. a scanner resolution level) as an attribute, the image data is converted into the prescribed level to meet the above-mentioned capture condition in accordance with the resolution level information. For example, when a resolution level of storage image data is 100 dpi, the resolution level is converted and extended to 200%, because a required resolution level is 200 dpi.

The image data having thus converted resolution level undergoes filter processing of a filter processing section 704 to adjust an intensity of a MTF in order to meet the above-mentioned capture condition. Since the picture mode is selected, filter processing is executed to slowdown the MTF of the image data. Filter processing is applied to image data of a character, a line, or the like to emphasize the MTF.

The image data after the filter processing undergoes density gamma processing of a density gamma section 705 to adjust a density characteristic in order to meet the above-mentioned capture condition. Since the picture mode is selected, gamma conversion processing, in which density inclination is decreased as much as possible is applied to increase reproducibility of halftone. When a character mode is selected, gamma conversion processing having sharp density inclination is applied to improve sharpness of character and line images and increase legibility of a character in image data.

Image data having received the filter processing is then quantized into binary state image data by a halftone processing section 706. Then, the image data is compressed by a compression device 707, outputted to the multi-purpose bus 114 by an output port 708, and transmitted to an external client apparatus 126.

Now, operations of an expansion device, a resolution level conversion device 703, a filter processing section 704, a density gamma section 705, an halftone processing section 706, and a compression device 707 collectively forming an image format conversion section 125 are described.

First, an operation of the expansion device is described. The image format conversion section 125 extends image data compressed in a first format using the expansion device to execute image processing that meets the above-mentioned capture condition. Such image data of the first format can include image data of a multipurpose data format, such as standardized JPEG, etc., and that of private use data format, such as private use fixed block length compression, etc.

Figure 8A:
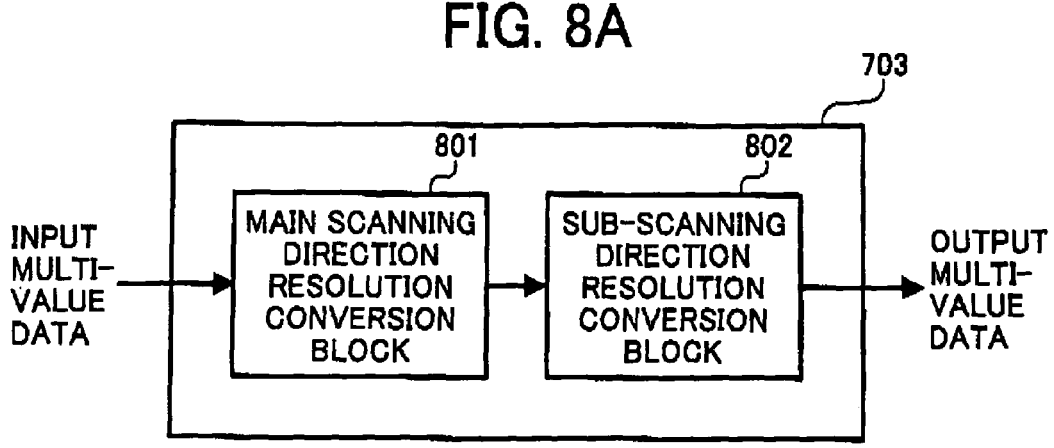
FIGS. 8A, 8B, and 8C each illustrates an exemplary resolution level conversion device.

Now, an operation of the resolution level conversion device 703 is described, wherein an exemplary system converts multi-value image data into data having an optional resolution level both in main and sub scanning directions. As shown in FIG. 8A, the resolution level conversion device 703 includes a main scanning direction resolution level conversion block 801 that converts a resolution level of multi-value image data in the main scanning direction, and a sub scanning direction resolution level conversion block 802 that converts a resolution level of the multi-value image data having undergone the conversion in the main scanning direction in the sub scanning direction.

Figure 8B:
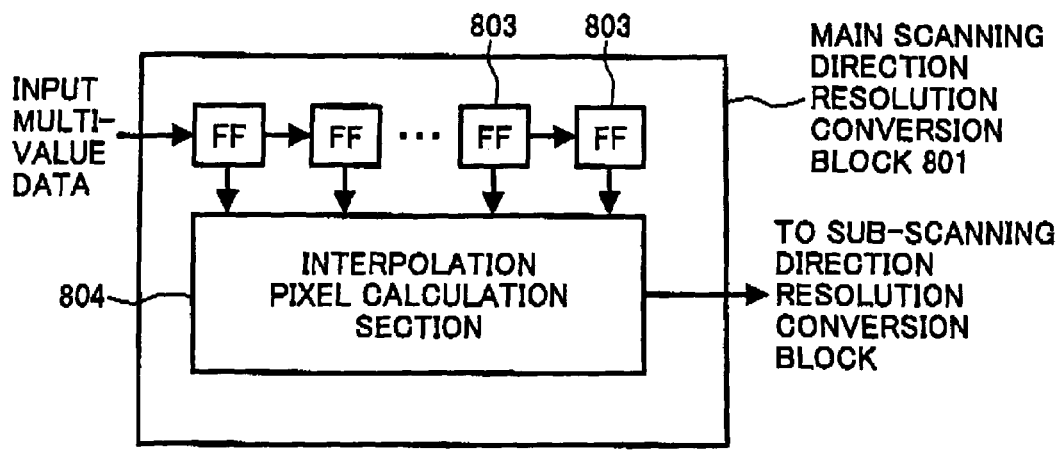

Further, as shown in FIG. 8B, the main scanning direction resolution level conversion block 801 interpolates a pixel in the main scanning direction to convert resolution of multi-value image data into a designated resolution level. A method of calculating a value of pixel data to interpolate can typically be a most approximate pixel displacement method, an adjacent two-pixel summation averaging method, a tertiary function convolution method or the like. Specifically, pixel data is stored in a plurality of flip-flops 803 each capable of latching one bit data, and an interpolation pixel calculation section 804 calculates a value of data to interpolate.

Figure 8C:
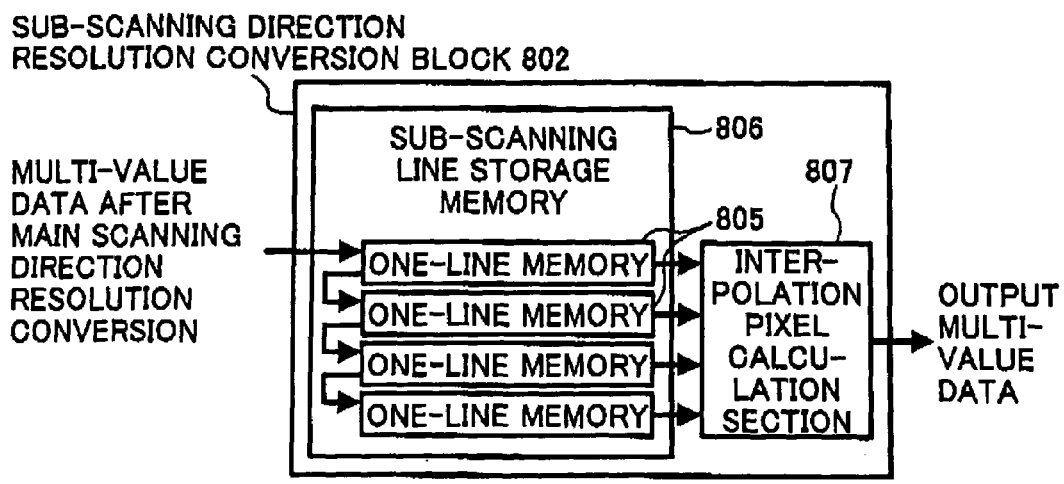

As shown in FIG. 8C, the data having undergone the resolution conversion in the main scanning direction is then inputted into the sub-scanning direction resolution conversion block 802 that includes a sub-scanning line memory 806 having a plurality of line memories 805, which is capable of storing one line value data having undergone the main scanning direction resolution. The sub-scanning direction resolution conversion block 802 calculates data to be interpolated by the interpolation pixel calculation section 807 in accordance with pixel data calculated in the sub-scanning direction.

Now, an operation of the filter processing section 704 is described with reference to FIGS. 9A and 9B. The filter processing is executed to modulate a MTF of image data either to increase a value of the MTF grater than that of original image data in order to emphasize an edge of an image or to decrease a value of the MTF in order to smooth an image.

Figure 9A:
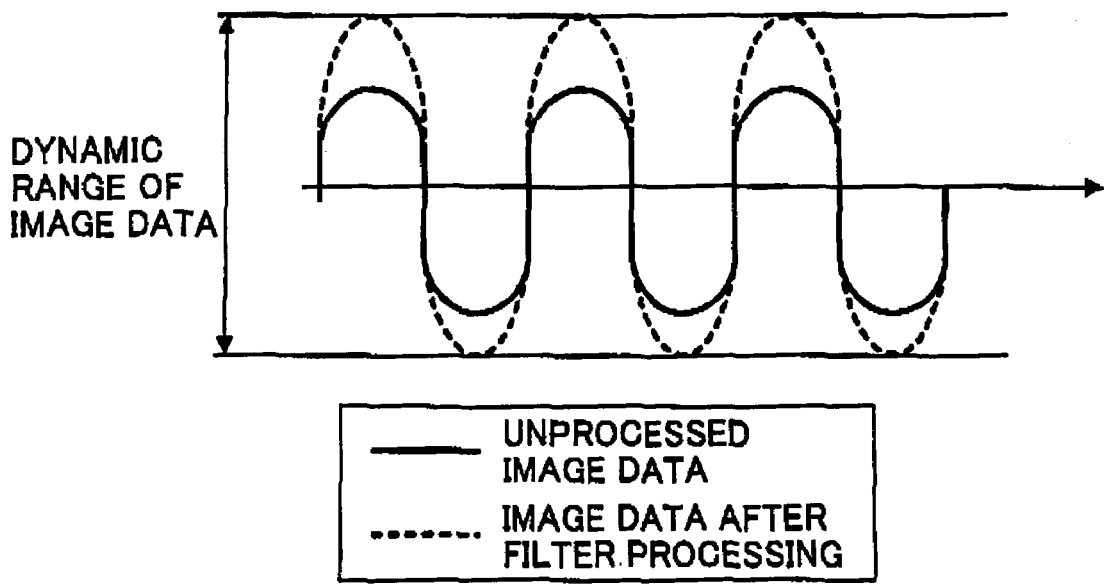

When a MTF of image data is to be increased, prescribed processing is executed to emphasize a upheaval of an image frequency as shown in FIG. 9A, in which a frequency of an image before the MTF processing is indicated by a solid line, and that after the filter processing is indicated by a dotted line. Further, a vertical axis indicates a dynamic range of image density, while a horizontal axis indicates a raster manner reference direction.

Figure 9B:
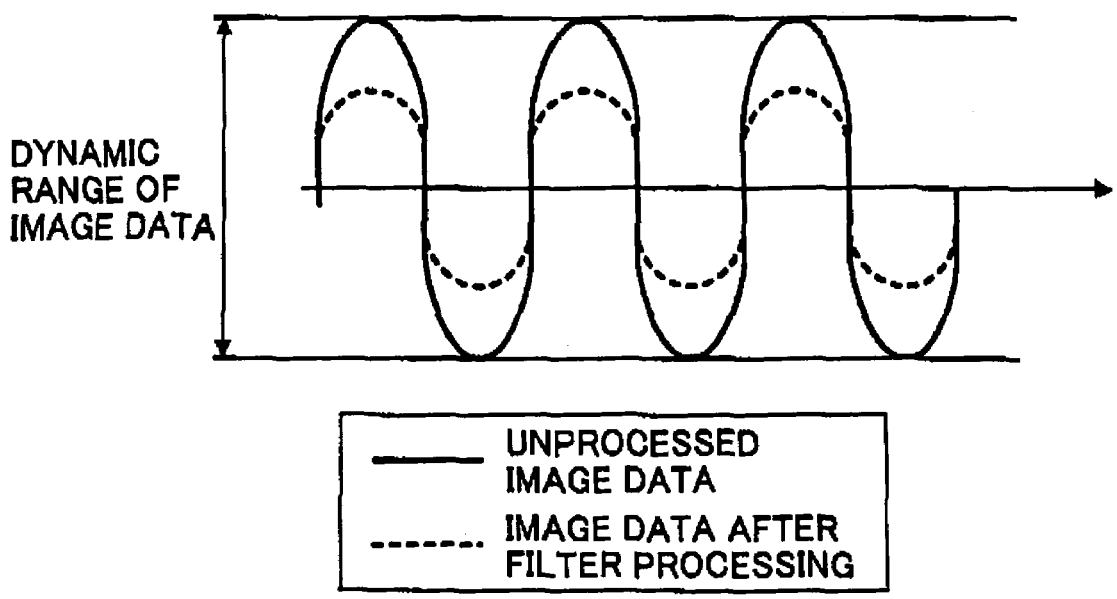

Similarly, when smoothing a MTF of image data, prescribed processing is applied to slow down an image frequency as shown in FIG. 9B. In practical processing, raster manner directions for two-dimensional image data are supposed to be a line direction (i.e., a X direction) and another direction (i.e., a Y-direction). Image data is processed in a unit of a line. A value of an attention pixel is calculated from values of peripheral pixels.

In FIG. 9C, 5×5 peripheral pixels are assigned reference signs Xn,m in relation to the attention pixel.

When a MTF of image data is to be increased, a differential coefficiency of a frequency of an image that requires emphasis is calculated from a plurality of differential coefficients arranged in a matrix state (a matrix coefficient). When the matrix coefficients are assigned reference signs in substantially the same manner as the peripheral pixel reference signs, such as An−2, m−2, An−1, m−1, . . . , An, m, An+1, m+1, An+2, m+2, a value Y of an attention pixel after filter processing is represented as follows:

$$B = (X_{n-2,m-2} \times A_{n-2,m-2}) + (X_{n-2,m-1} \times A_{n-2,m-1}) + \ldots + (X_{n+2,m+2} \times A_{n+2,m+2}) \quad (1)$$

$$D = B \times C \quad (2)$$

$$Y = D + X_{n,m} \quad (3)$$

The formula (1) provides a matrix product by multiplying image data by the matrix differential coefficients. A value B calculated by the formula (1) is an emphasizing component obtained by the filter processing. The formula (2) optionally amplitudes or damps the emphasis component. A value of an attention pixel is finally calculated by the formula (3) when the value emphasized by the filter processing in the formula (2) is added to an attention pixel value. A MTF of the image data is increased by converting image data using the above-mentioned calculation.

When image data is to be smoothed, peripheral pixels are added to an attention pixel and their sum is divided by E numbers of pixels, thereby an average value of the sum is obtained. Thus, smoothing of the image data is executed by converting the image data using such calculation. When weights for an attention pixel and its peripheral pixels are differentiated by substituting an optional integer into the matrix coefficient, a value Y of the attention pixel may be adjusted as shown in the following formula (4).

$$Y = (X_{n-2,m-2} \times A_{n-2,m-2}) + (X_{n-2,m-1} \times A_{n-2,m-1}) + \ldots + (X_{n+2,m+2} \times A_{n+2,m+2})/E \quad (4)$$

By executing the above-mentioned processing, the filter processing section 704 applies MTF modulation to a multi-value image data. Thus, when an original image mainly includes a character, an image quality can be improved by emphasizing the MTF. If the image mainly includes a picture, an image quality can also be improved by slightly providing smoothing. Thus, a high quality image can be obtained by selecting a filter coefficient in accordance with a type of an image.

Figure 10A:
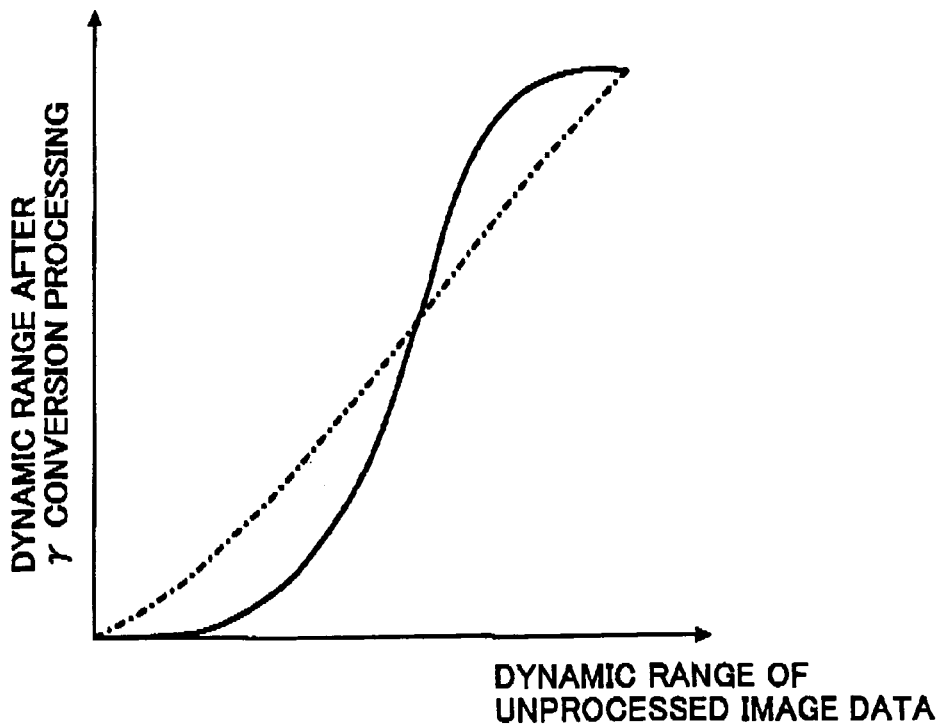
FIGS. 10A and 10B each illustrates exemplary $\gamma$ conversion processing.

Now, an operation of the density gamma section 705 is described. A gamma conversion processing changes density inclination and characteristic of an image. As shown in FIG. 10A, when a solid line serves as a gamma conversion table, image data after gamma conversion converted from unprocessed image data defined on a horizontal axis is simply correspondingly defined on a vertical axis. The original image data can be converted to have a desired density distribution when a curvature of the conversion table is changed. For example, when a gamma conversion table shown by a dotted line in FIG. 10A is used, image data after gamma conversion can have smoother inclination than that after the gamma conversion executed with the gamma conversion table shown by the solid line. Density, however, increases in a direction shown by an arrow.

Now, a method of creating the gamma conversion table is described with reference to FIG. 10B, in particular to a gamma conversion table indicated by a dotted liner line, which extends from an origin of coordinates by the angle of 45°.

Figure 10B:
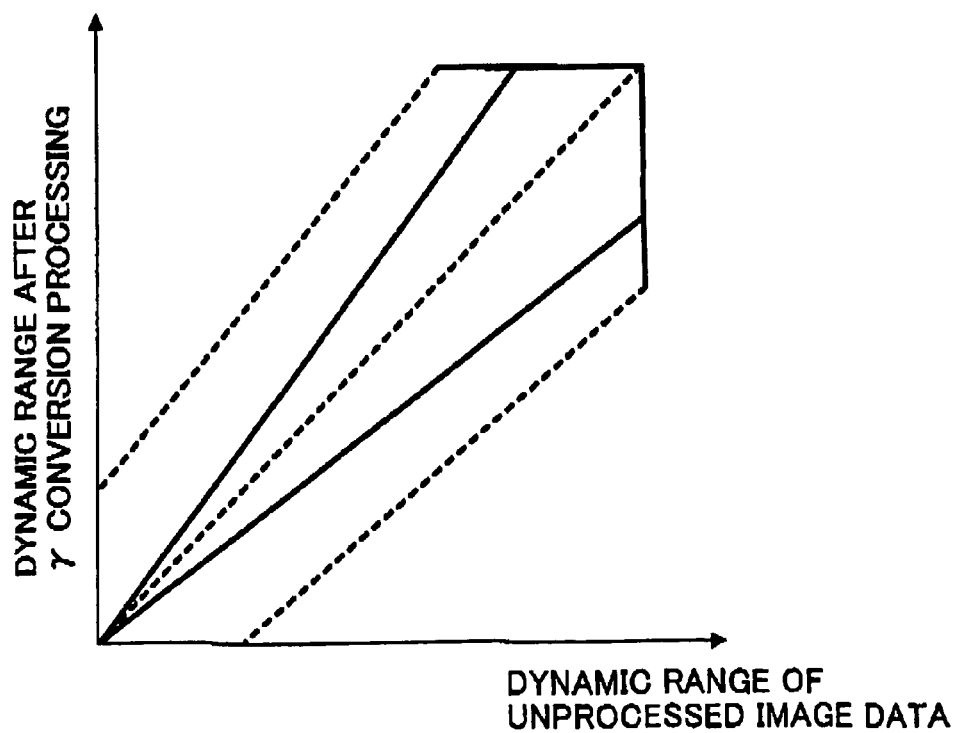

When density of a whole image is to be increased or decreased without changing a density performance, the gamma conversion table of the dotted line is preferably moved in parallel in the direction of the horizontal axis as shown in FIG. 10B. When inclination of density of an image is to be changed, the inclination of the gamma conversion table is preferably changed. An optional density performance can be obtained if a curving degree of the gamma conversion table shown in FIG. 10A is changed.

Thus, the density gamma section 705 can change density inclination and performance of multi-value image data. Thus, a high quality image can be obtained by selecting a gamma curvature in accordance with a type of an image.

Now, an operation of the halftone processing section 706 is described with reference to FIGS. 11A and 11B. The halftone processing section 706 quantizes multi-value image data into binary or similar numbers of gradation. Among various specific methods that realize such quantization, only a simple quantization method, a dither method, and an error diffusion method are described as typical examples, wherein a gradation number of quantization is herein after supposed to be two.

The simple quantization method quantizes multi-value image data using an optional value included in a dynamic range of the multi-value image data as a threshold. For example, when multi-value image data having a dynamic range from zero to 255 gradations is quantized into values of zero and "1" using a threshold value "128", image data with 100 gradation is quantized into "zero", and that with 200 gradation, into "1", respectively.

Figure 11A:
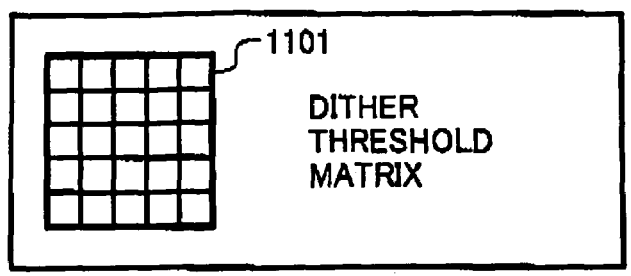
FIGS. 11A and 11B each illustrates an exemplary dither method.
Figure 11B:
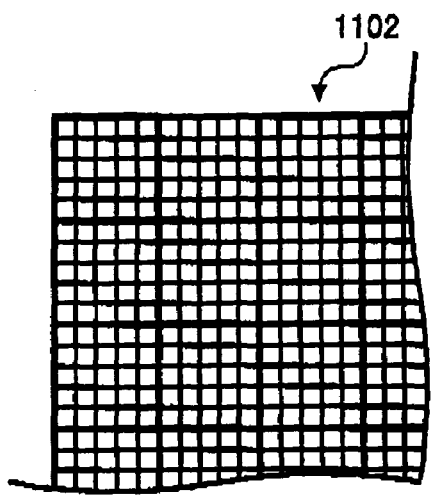

The dither method executes two-gradation level processing per pixel such that a dither threshold matrix 1101 of FIG. 11A is applied to image data 1102 of FIG. 11B such that one threshold is applied to one pixel. When a threshold in the matrix is set to vary within a dynamic range of image data, gradation and image resolution are tradeoff. However, halftone can be reproduced even if image data has the two-gradation level.

The error diffusion method executes two-gradation level processing using an optional threshold. However, the method executes halftone processing by accumulating the quantization errors and quantizing an attention pixel in processing in accordance with fixed errors of its peripherals which already completes the quantization processing in a raster order, while reducing a total error caused during the quantization as least as possible.

The error is exemplified as follows: Image data with the 100 gradation level becomes zero after quantization as the least even if the image data includes information of the 100 gradation level. Thus, a quantization error (Z) of image data is calculated by the following formula as the maximum in the dynamic range:

$$Z=100=100-0$$

Further, since image data with 200 gradation level becomes "1" as the largest after quantization even if the image data originally includes information of the 200 gradation level. A quantization error (Z) of the image data is calculated by the following formula as the largest dynamic range value:

$$Z=-55=200-255$$

Figure 12:
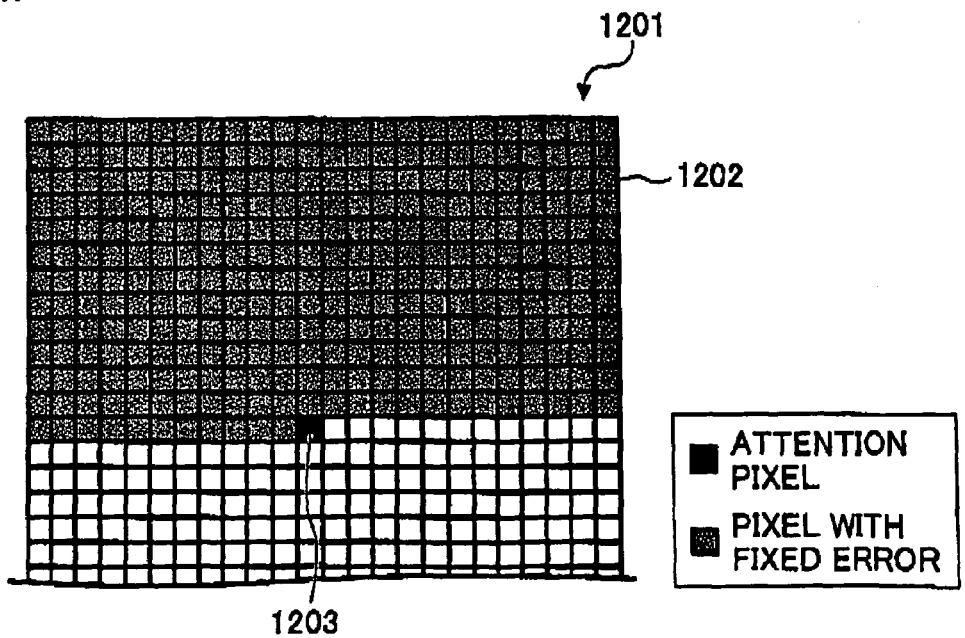
FIG. 12 illustrates an error diffusion method.

If such quantization error values are accumulated as separate data from image data per pixel, pixels 1202 covered by a grid as shown in FIG. 12 represent that quantization errors thereof are fixed and stored. The error diffusion method moderates drops of halftone information, which are caused by the total quantization error by executing the two gradation processing after adding fixed error values of peripherals to a value of the attention pixel 1203.

Thus, the halftone processing section 706 can apply binary processing to multi-value image data. Thus, a high quality image can be obtained while decreasing a data value in the above-mentioned manner by selecting a halftone processing in accordance with a type of an image.

The extension device 702 is now described in detail. The extension device 702 is provided to designate a format of image data to be outputted. The extension device 702 generate image data in a second format by compressing the image data having undergone the above-mentioned respective image processing to output it to an external client apparatus 126. The image data of the second format can be a type of a multipurpose image file format, such as a TIFF, that of a multipurpose compression format for a still image, such as a JPEG, a JPEG2000, etc., or that of a private use data format, such as private use block fixed length compression, etc.

Figure 13:
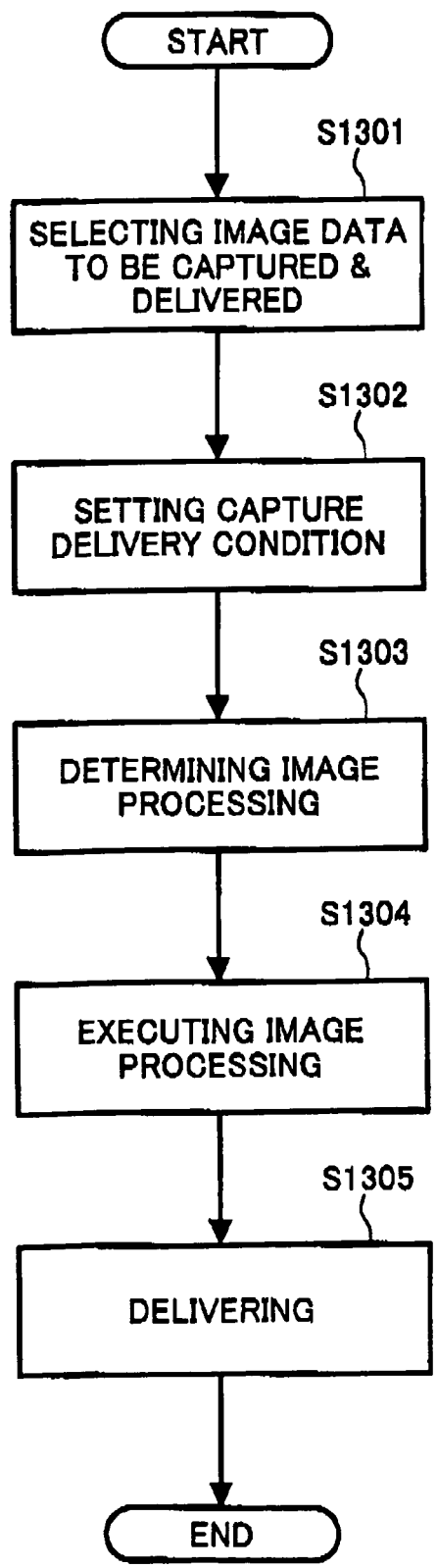
FIG. 13 illustrates exemplary procedure of image data capture processing.

Now, a procedure of image data capturing executed in an image processing system according to a first embodiment is described with reference to FIG. 13.

Initially, a user selects image data to be captured and delivered from a hard disc 118 at an external client apparatus 126 in step S1301. Specifically, the image data is selected through a capture data selection screen 500 displayed on a display device of the external client apparatus 126 as shown in FIG. 5.

Subsequently, the user designates a capture delivery condition of image data to be captured in step S1302. The capture delivery condition is designated by selecting an applicable item on a capture condition designating screen 600 displayed on the display device as shown in FIG. 6. The capture delivery condition includes an image quality mode, a resolution level, halftone processing, an output format of image data, for example.

The printer controller 115 determines an image processing manner to be executed to meet the capture and delivery condition designated in step S1302 with reference to the image data selected in step S1301 in step S1303.

The image format conversion section 125 applies prescribed image processing determined in step S1303 to the image data selected in step S1301 in step S1304.

The image format conversion section 125 delivers the image data after the image processing to the external client apparatus 126 as a requestor having requested for capturing and delivering in step S1305.

Figure 14:
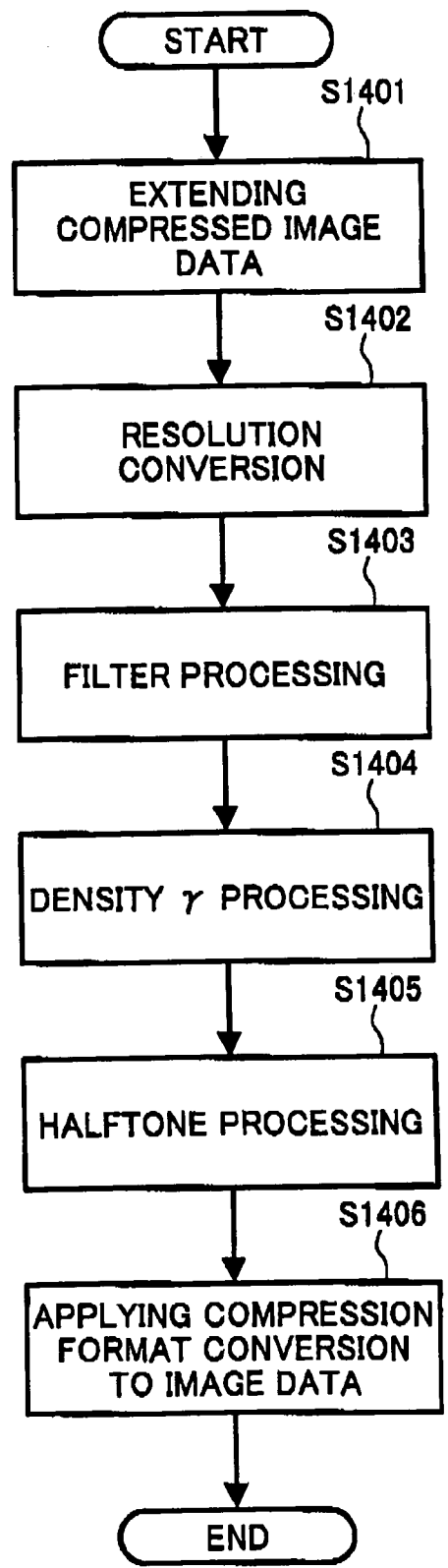
FIG. 14 illustrates exemplary procedure of image data Format conversion processing.

Now, image data processing executed by the image format conversion section 125 is described with reference to FIG. 14.

Since image data inputted to the image format conversion section 125 is compressed, the extension device 702 extends the image data so that the image data can be decoded into multi-value data in step S1401. Then, the resolution level conversion device 703 applies resolution level conversion processing to the image data now decoded into the multi-value data in step S1402. The filter processing section 704 applies filter processing to the image data in step S1403. Then, the density gamma section 705 applies density gamma processing to the image data in step S1404. The halftone processing section 706 applies halftone processing thereto in step S1405. The compression device 707 then applies compression processing and converts the image data into a prescribed format designated by the user after various processing in step S1406.

Now, a second embodiment of the present invention will be described with reference to FIGS. 15 and 17. Since an image processing system of the second embodiment is substantially the same to that in the first embodiment, a description of the same section is omitted. A difference from the first embodiment is to designate a capture and delivery condition of image data not from the external client apparatus 126 but at an image processing apparatus 100. Series of processing of image data delivered from the image processing apparatus 100 to an external client apparatus 126 is described with reference to FIG. 15, wherein an arrow indicates a flowing direction of the image data.

Figure 15:
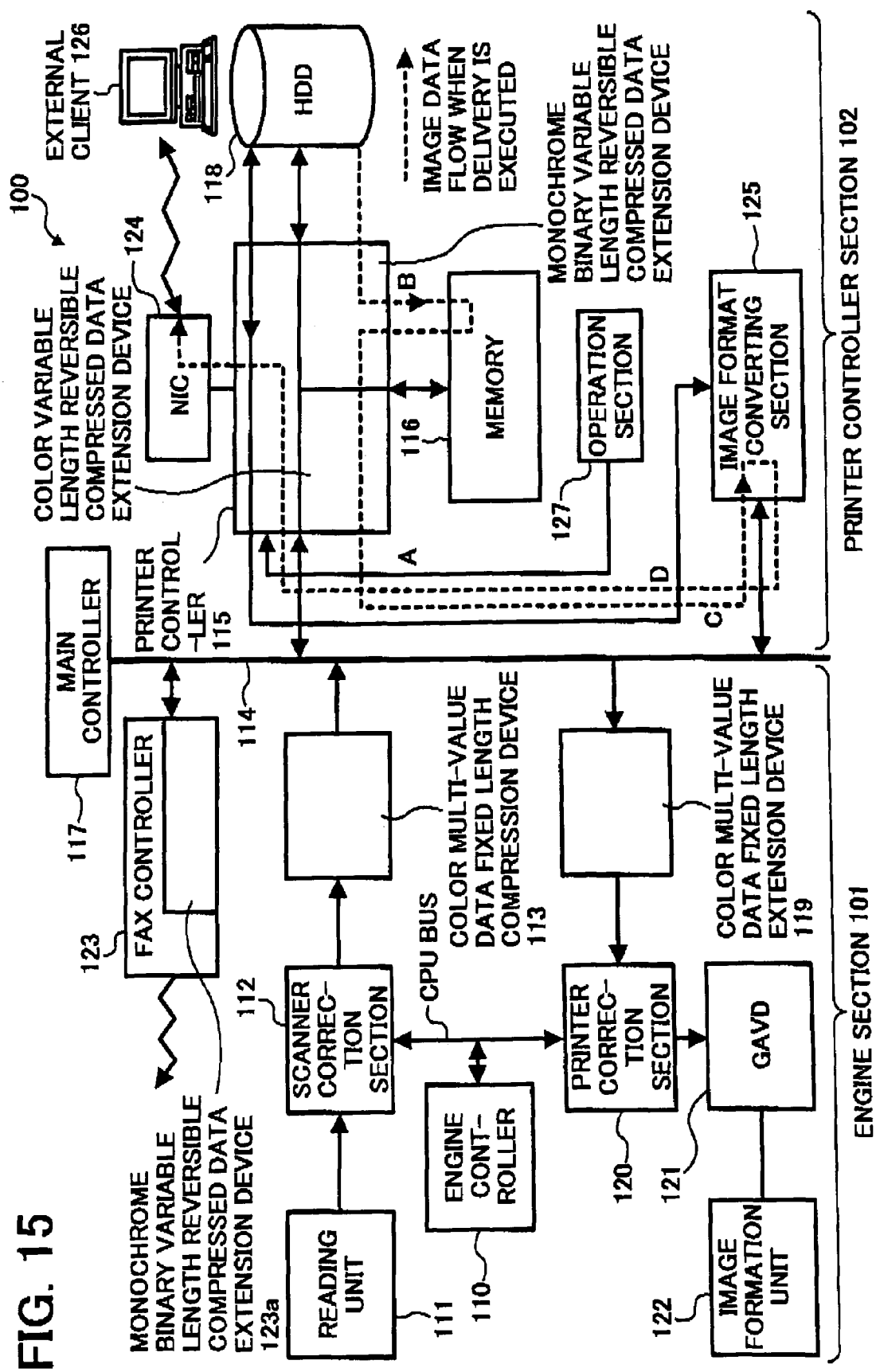
FIG. 15 illustrates an exemplary operation of image processing system according to a second embodiment.
Figure 16:
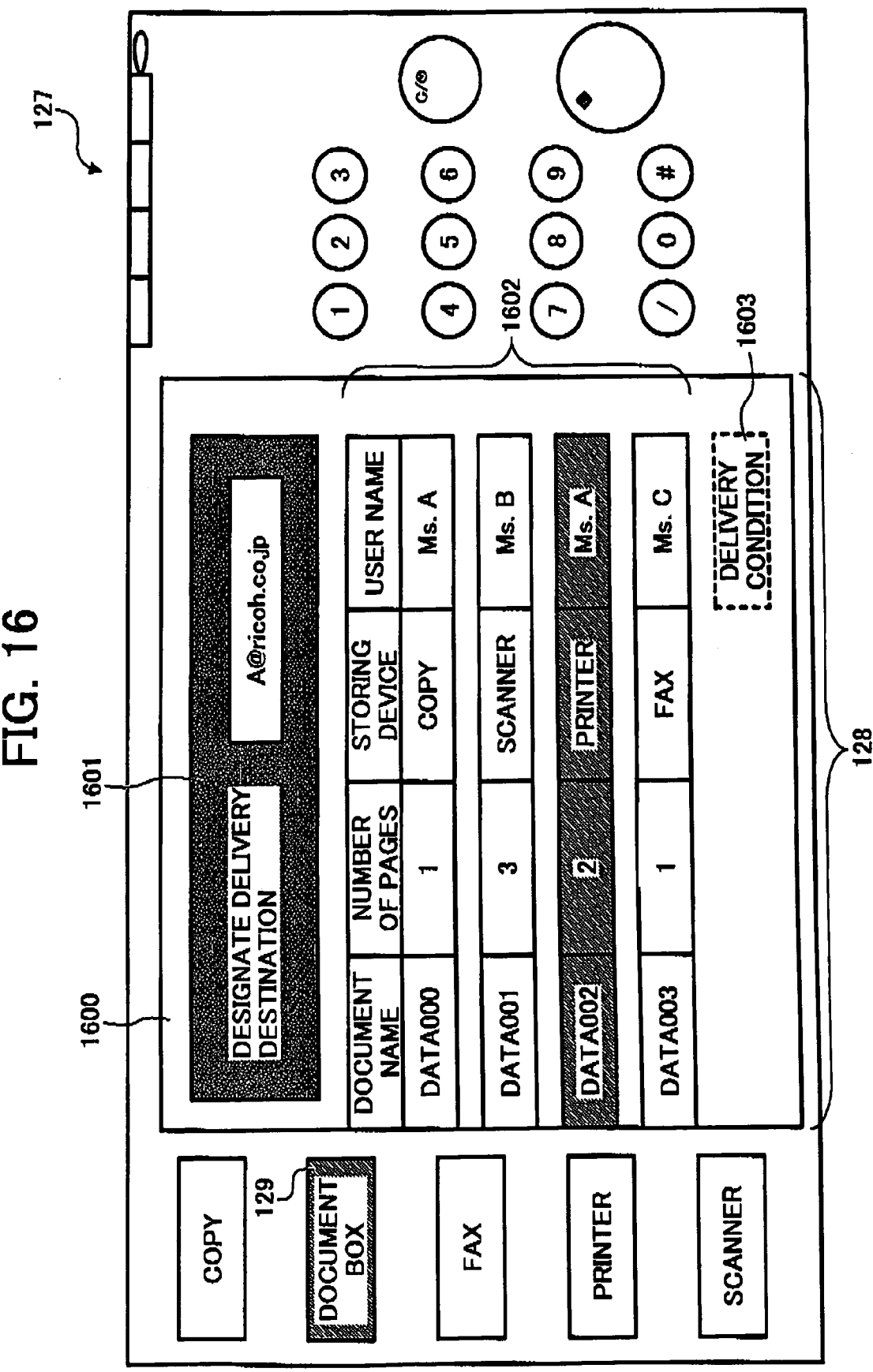
FIG. 16 illustrates an exemplary delivery data selection screen displayed on a display section of an operational section of an image processing apparatus.

As shown in FIG. 15, a hard disc 118 stores image data having undergone scanner correction processing as in the first embodiment. A user can display and inspect titles (e.g. document names) of image data stored in the hard disc 118 on a display section 128 of an operation section 127 as shown in FIG. 16, wherein an exemplary screen to be displayed on the display section 128 is illustrated.

Initially, a user selects image data to be externally delivered from the operation section 127. When the user depresses a document box button 129 on the operation section 127 as shown in FIG. 16, a delivery data selection screen 1600 appears on the display section 128. A delivery destination designation column 1601 and image data 1602 stored in the hard disc 118 are displayed on the delivery data selection screen 1600. Then, the user selects image data to be externally delivered among respective image data displayed thereon and designates a prescribed delivery destination. For example, the user can select image data of DATA 002, and designates a prescribed E-mail address. A name of a client apparatus connected over the network can be designated as a delivery destination.

When image data to be delivered is selected, a delivery destination is designated, and a delivery condition button 1603 is depressed, a delivery condition designating screen 1700 appears on the display section 128 as shown in FIG. 17. Various conditions such as an image quality mode (e.g. character, character/picture, picture, OCR), a resolution level (e.g. 600 dpi, 400 dpi, 300 dpi, 200 dpi), halftone processing (e.g. binary, multi-value), an output format (e.g. JPEG, TIFF, JPEG2000), etc., used when image data is delivered can be designated through the delivery condition designating screen 1700. Delivery processing of the selected image data starts when a delivery button 1701 is depressed.

In this example, delivery conditions are designated such that an image quality mode is character, a resolution level is 400 dpi, binary is designated as halftone processing, and an output format is TIFF.

When a condition of delivering image data to an external client apparatus 126 is designated on the operation section 127, and delivery of image data stored in the hard disc 118 is requested in such a way, the delivery condition is transmitted to the printer controller 115 as shown in FIG. 15A. The printer controller 115 then temporary spreads the image data stored in the hard disc 118 in a semiconductor memory 116 as shown in FIG. 15B. The printer controller 115 checks an attribute of the image data in the semiconductor memory 116, and determines a manner of image processing to be applied to the image data to meet the above-mentioned capture request. The printer controller 115 transmits the image data in the semiconductor memory 116 to the image format conversion section 125 via the multi-purpose bus 114 along with an instruction for using and executing the image processing manner as shown in FIG. 15C. The image format conversion section 125 receives and applies prescribed image processing, such as gamma correction processing for character mode use, filter processing for character mode use, magnification processing at 400 dpi, halftone processing for generating binary data, a TIFF format output, etc., to image data, because the delivery request mode is a character mode in this example. The image format conversion section 125 then delivers the image data having undergone the image processing to the external client apparatus 126 via the NIC 124 as shown in FIG. 15D. Further, when a plurality of external client apparatus 126 are connected to the network, image data can be delivered in conformity with respective optimal delivery conditions.

Thus, image data stored in a hard disc 118 of an image processing apparatus 100 is enabled to be converted into a format desired by a user and is delivered to an external client apparatus 126. Since a sequence of image format conversion in the second embodiment is substantially the same to that in the first embodiment except that a designation step is added to the step S1301 of FIG. 13, description thereof is omitted.

Numerous additional modifications and variations of the present invention are possible in light of the above teachings. It is therefore to be understood that within the scope of the appended claims, the present invention may be practiced otherwise that as specifically described herein.

What is claimed is:

1. An image processing system configured to connect at least one client apparatus to an image processing apparatus via a network, said image processing apparatus comprising:

a reading device configured to read an image of an original document and generate a prescribed image signal;

an image data generating device configured to apply prescribed image processing to the image signal to generate image data;

a memory configured to store the image data;

a data compression and expansion device configured to compress and expand the image data;

a format converting device configured to convert the image data stored in the memory into a prescribed format in accordance with a format condition including one or more capture conditions, one of said capture conditions is designating halftone processing information for generating either binary data or multi-value data, designated by the at least one client apparatus which includes a display which displays a capture condition selection screen that displays buttons for selecting said one or more capture conditions, and the format condition designating device is configured to designate the format condition after the image of the original document has been read;

a delivering device configured to deliver the image data converted to the prescribed format to the at least one client; and a control device configured to generally control the image processing apparatus.

2. The image processing system according to claim 1, wherein one of said capture conditions is designating an image quality of the image of the original document as at least one of a character, a picture and character, a picture, or a document for which to apply OCR.

3. The image processing system according to claim 1, wherein one of said capture conditions is designating resolution information.

4. The image processing system according to claim 1, wherein one of said capture conditions is designating a file image format information identifying a file format of the image data.

5. The image processing system according to claim 1, wherein said format converting device includes a resolution converting member configured to convert a resolution level of the image data into a prescribed level.

6. The image processing system according to claim 1, wherein said format converting device includes a filter processing member configured to apply prescribed filter processing to the image data.

7. The image processing system according to claim 1, wherein said format converting device includes a density gamma processing member configured to apply prescribed density gamma processing to the image data.

8. The image processing system according to claim 1, wherein said format converting device includes a halftone processing member configured to apply prescribed halftone processing to the image data.

9. The image processing system according to claim 1, wherein said format converting device includes a format converting member configured to convert an image format of the image data into a prescribed image format.

10. The image processing system according to claim 1, wherein the one or more capture conditions displayed on the capture condition selection screen includes multiple resolution settings, multiple image quality mode settings, and outputted data format settings.

11. The image processing system according to claim 1, wherein the image processing apparatus includes a scanning function, and reading of the original document is executed by the scanning function.

12. The image processing system according to claim 1, wherein the image processing apparatus includes a copying function, and reading of the original document is executed by the copying function.

13. An image processing system configured to connect at least one client apparatus to an image processing apparatus via a network, said image processing apparatus comprising:

a reading device configured to read an image of an original document and generate a prescribed image signal;

an image data generating device configured to apply prescribed image processing to the image signal to generate image data;

a memory configured to store the image data;

a data compression and expansion device configured to compress and expand the image data;

a format condition designating device configured to receive from the at least one client apparatus a format condition including one or more capture conditions of the image data, one of said capture conditions is designating halftone processing information for generating either binary data or multi-value data, and designate the format condition based on the format condition received from the at least one client apparatus which includes a display which displays a capture condition selection screen that displays buttons for selecting said one or more capture conditions, and the format condition designating device is configured to designate the format condition after the image of the original document has been read;

a format converting device configured to convert the image data stored in the memory into a prescribed format in accordance with the format condition designated by the format condition designating device;

a delivering device configured to deliver the image data converted to the prescribed format to a prescribed at least one client; and a control device configured to generally control the image processing apparatus.

14. A computer readable storage medium in which a computer executable program is recorded, which when executed by a computer system, causes the computer system to execute a method comprising:

reading an image of an original document and generating a prescribed image signal;

applying prescribed image processing to the image signal to generate image data;

storing the image data in a memory;

compressing and expanding the image data;

converting the image data stored in the memory into a prescribed format in accordance with a format condition including one or more capture conditions, one of said capture conditions is designating halftone processing information for generating either binary data or multi-value data, designated by at least one client apparatus after the image of the original document has been read, and the at least one client apparatus includes a display which displays a capture condition selection screen that displays buttons for selecting said one or more capture conditions;

delivering the image data converted to the prescribed format to at least one client; and controlling an image processing apparatus.

* * * * *